Jan. 13, 1959

W. E. LEUSZLER ET AL 2,868,313

APPARATUS FOR SEPARATING FLUIDS

Filed Dec. 2, 1955

Wayne E. Leuszler
Loren E. Wood &
Alvin P. Teal
INVENTORS

BY

Attorney

United States Patent Office 2,868,313
Patented Jan. 13, 1959

2,868,313

APPARATUS FOR SEPARATING FLUIDS

Wayne E. Leuszler and Loren E. Wood, Oklahoma City, Okla., and Alvin P. Teal, Alice, Tex., assignors to Black, Sivalls & Bryson, Inc., Kansas City, Mo., a corporation of Delaware Application December 2, 1955, Serial No. 550,525

2 Claims. (Cl. 183—2.7)

The present invention relates to an apparatus for separating and treating oil and water emulsions. This invention relates more particularly to apparatus for treating oil and water emulsions which utilizes the natural tendency of the two fluids to separate and also it relates to a horizontal vessel in which treating oil and water emulsions may be practiced.

Previous apparatus for treating oil and water emulsions have utilized the addition of heat and chemicals in an effort to separate the water from the oil and also have used baffles, elongated flow paths and other systems and devices to aid in the desired separation. We have found that many of these apparatus other than those involving heating and allowing the hot emulsion to enter into a quiescent zone of settling and separation where the natural immiscibility of the two liquids and their difference in specific gravity will cause them to separate if they are not disturbed by incoming emulsion, have had the effect of causing turbulence and thereby preventing separation of the two liquids.

Another feature of previous devices which hinders quick and complete separation of the oil and water is that the influent emulsion stream is usually introduced into the treating zone at a point either below the upper level of the water stratum or above the lower level of the oil stratum. It is obvious that this feature would cause turbulence throughout the separation zone and would additionally delay the separation.

Therefore, the primary object of the present invention is to provide apparatus for the separation of the oil and water components of an emulsion stream with a minimum of turbulence.

Further objects of the present invention are to provide apparatus for separating the oil and water components of an emulsion stream utilizing the natural tendency of the two liquids to separate; to provide an emulsion treater in which the emulsion is delivered into a settling zone without causing turbulence; to provide an emulsion treater having a minimum of restriction to the normal separation flow of the components of an emulsion; and to provide apparatus for separating the oil and water components of an emulsion stream wherein the flow of one component through a stratum of the other component is minimized.

In accomplishing these and other objects of the present invention we have provided improved details of structure, the preferred form of which is illustrated in the accompanying drawing wherein.

Figure 1:
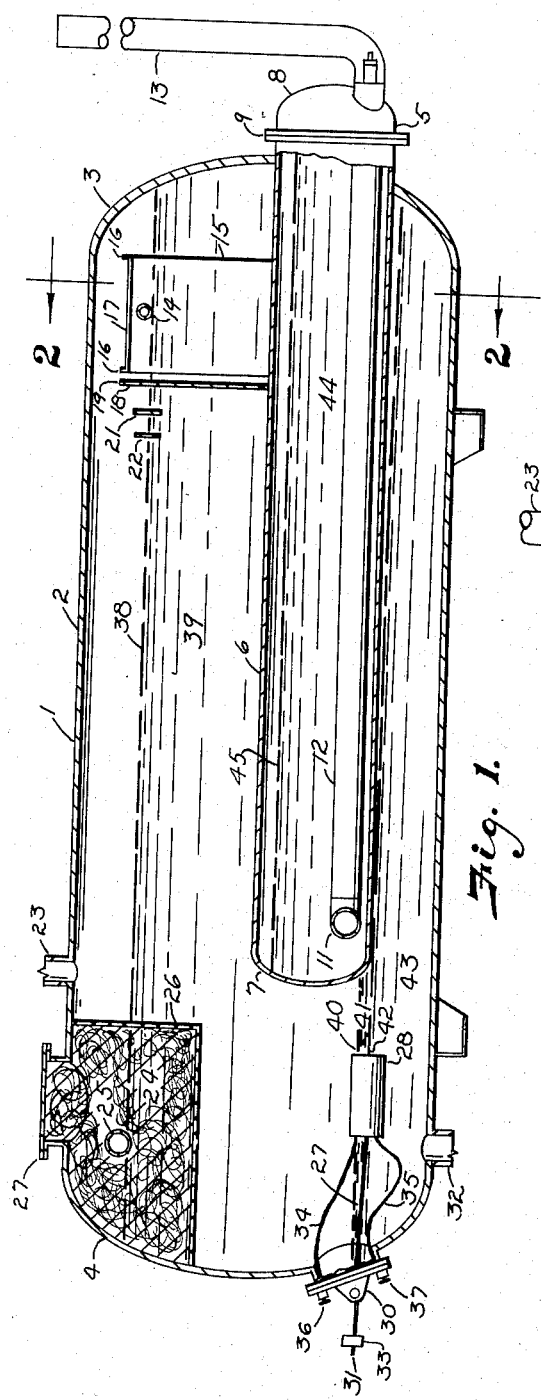
Fig. 1 is a sectional view of a horizontal emulsion treater constructed in accordance with the present invention.
Figure 2:
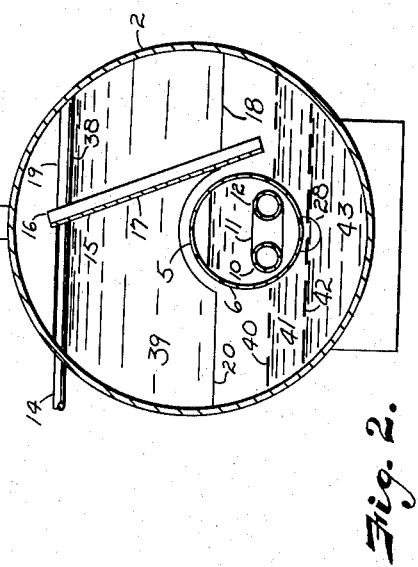
Fig. 2 is a sectional view of the treater illustrated in Fig. 1 taken along lines 2—2.

The device shown in Fig. 1 is a horizontal emulsion treater and is generally designated 1 in the drawings. This treater 1 is composed of a horizontally disposed cylindrical shell 2 and dished heads 3 and 4. Steam chest 5 extends through the lower portion of head 3, positioned as best shown in Fig. 2 and including a cylindrical shell 6 and heads 7 and 8 closing both ends of shell 6. For repair and cleaning convenience steam chest 5 is held in place with flanges 9 which are held together by bolting or other suitable means. Firetube 10 extends through head 8 and within shell 6 of chest 5 substantially the entire length of chest 5 ending in a return bend 11. Exhaust firetube 12 extends through steam chest 5 parallel to firetube 10 and out through head 8 and is connected to exhaust stack 13.

Emulsion inlet conductor 14 extends through the shell 2 and through inlet spreader plate 15. Conductor 14 terminates immediately after passing through spreader plate 15 as best shown in Fig. 2. Inlet spreader plate 15 is positioned within treater 1, extending from a position substantially above steam chest 5 to a position near the lower portion and to one side of chest 5. Spreader plate 15 has flanges 16 extending upwardly at either side of web portion 17.

Baffle plate 18 is secured to shell 2 and has its upper edge 19 spaced from the upper portion of shell 2 and has its lower edge 20 in close spaced relationship with the uppermost portion of steam chest 5 and extends across treater 1 at either side of chest 5 at a level near the top of steam chest 5. As best shown in Fig. 1, baffle 18 is spaced from spreader plate 15 by only a short distance.

Transverse baffles 21 and 22 extend across treater 1 in its upper area, are secured at their ends to shell 2 and have their upper edges spaced from the top portion of shell 2.

Gas outlet duct 23 is secured through shell 2 at a position spaced from inlet conductor 14 toward head 4. No mist extraction member is shown but obviously if needed, one could be installed in the upper portion of the treater 1 near the outlet duct 23.

Filter bed 24 surrounds the opening of oil outlet duct 25. Duct 25 extends from the position within filter bed 24 out through shell 2. The filtering material in filter bed 24 is supported by screens 26 which are secured to shell 2 and head 4. Manway 27 is used as the opening for loading and replacing the filtering material in filter bed 24.

A flanged opening in the lower portion of head 4 is provided to accommodate float 28, float connecting rod 29 and float flange 30. Float flange 30 is so constructed that the movement of float 28 is transmitted to lever 31 which is connected through some linkage to a valve (not shown) controlling water discharge through water outlet duct 32. Weight 33 is mounted on lever 31 to balance the weight of float 28.

Flexible tubes 34 and 35 are connected into the upper and lower portions of float 28 respectively and extend through float flange 30 to valved fittings 36 and 37. Tubes 34 and 35 provide a duct from outside treater 1 to the interior of float 28, for the purposes as hereinafter set forth.

In operation, the influent emulsion enters treater 1 through inlet conductor 14 and is allowed to flow onto inlet spreader plate 15. Flanges 16 prevent the influent stream from spilling over into the area adjacent to baffle 18. The influent stream of emulsion flows down spreader plate 15 since the emulsion is heavier than the treated oil in the area surrounding inlet conductor 14. Spreader plate 15, being positioned above and beside steam chest 5, provides a warm surface on which the incoming emulsion is spread, thereby assisting the release of gas trapped in the emulsion. This release of gas at a point near the emulsion inlet into treater 1 is important since it will minimize the release of the gas in other zones where such release could cause turbulence and prevent the quiescent separation of the oil and water components of the emulsion stream. The surface of spreader plate 15 is sufficiently warmed by reason of its proximity to steam chest 5 to cause a release of almost all of the gas which is contained in the emulsion stream and which would be released by the heat of treating temperatures.

The liquid levels or interfaces are indicated in both Figs. 1 and 2 where 38 indicates the upper surface of the oil stratum 39, 40 indicates the interface between oil stratum 39 and emulsion stratum 41, and 42 indicates the interface between emulsion stratum 41 and water stratum 43. It should be noted that inlet conductor 14 discharges the influent emulsion at a level approximately the same as oil surface 38 or slightly thereabove to eliminate excessive turbulence from the release of gas in the portion of oil stratum 39 near spreader plate 15.

The emulsion flowing down spreader plate 15 will spread and be discharged into the lower portion of the oil stratum and into the emulsion stratum. This provides a flow path for the emulsion whereby it does not have to flow up through water stratum 43 and its flow through oil stratum 39 is in a confined area. In this flow path the emulsion stream is effectively delivered to the emulsion stratum 41 after having most of the gas liberated and without having to flow through the water or oil strata 43 and 39 except as described.

Steam chest 5 is used for heating oil and emulsion strata 39 and 41. This heat is obtained by burning natural gas, liquefied petroleum gas, or oil in firetube 10 and transmitting the heat through the walls of firetube 10, return bend 11 and exhaust firetube 12 to liquid heat exchange medium 44, usually water, which fills steam chest 5 to the level as indicated by 45. Steam chest 5 is shown positioned in treater 1 above interface 42 so that heating of water will be held to a minimum.

A sufficient depth of separated water is maintained below steam chest 5 so that large amounts of water in the emulsion stream will not interfere with the treating of the emulsion. Also, this depth eliminates the possibility of the emulsion or treated oil being discharged out through water outlet 32. Heating of the water is also held to a minimum since any free water entering the treater 1 with the emulsion will be discharged downwardly through oil stratum 39 with said emulsion stream, directly through emulsion stratum 41 and into water stratum 43 without being heated substantially except by contact with spreader plate 15 and that portion of the warm heated oil in oil stratum 39. Steam chest 5 is used since it is desired that heat be applied directly in emulsion and oil strata 39 and 41.

Another advantage of spreader plate 15 is that it provides a large area for free oil to separate out of the emulsion stream without having to pass through water stratum 43. The sloping configuration of spreader plate 15 also causes any mud, sand, or other foreign matter to be directed to the lower portion of treater 1 without allowing such matter to accumulate on or even come into contact with steam chest 5.

Baffle plate 18, as previously described, extends across treater 1 and is spaced from the upper portion of shell 2 to provide a space for the gas to pass toward gas outlet 23. Upper edge 19 of baffle 18 is also spaced above oil surface to prevent any foam from carrying over onto oil surface 38 and out gas outlet 23. Lower edge 20 of baffle 18 extends a substantial distance below oil surface 38 in oil stratum 39 but terminating in edge 20 a short distance above steam chest 5 and also above emulsion-oil interface 40 so that any free oil separating in the emulsion inlet area will not be forced to pass through emulsion stratum 41 in flowing toward oil outlet 25. This baffle 18 will also prevent any emulsion which spills over flanges 16 of spreader plate 15 from flowing down through oil stratum 39 within the quiescent zone of treater 1. Baffles 21 and 22 are installed across shell 2 at a level extending above oil surface 38 and slightly therebelow. These baffles are foam reduction baffles and will catch any foam which overflows upper edge 19 of baffle 18 and retain it in position so that it will be heated sufficiently to be dissipated.

Float 28 has ducts 34 and 35 connected into its interior. Thus liquid may be added to float 28 through ducts 34 and 35 by opening valve fittings 36 and 37. In adding or withdrawing liquid from the interior of float 28 the position of float 28 with respect to the different strata in which it will float is determined. Thus, if a heavier than normal oil is being treated, the float will have to be adjusted to float in treater 1 in a position which will be an accurate indication of the level of interface 42. Normally floats are made to have a certain buoyancy by sealing liquid within the float. This would make the float inaccurate in instances for which the float had not been designed. By providing external fittings to change the liquid within float 28, we have provided a means of changing the buoyancy of the float while it is in operation, thereby making it sensitive to the particular stratum. Also it is sensitive to the stratum in the degree desired. weight 33 is used to balance the float to maintain it in a normally horizontal position. This design also facilitates the installation of float 28 into treater 1.

The emulsion discharged from spreader plate 15 accumulates in emulsion stratum 41 along the length of treater 1. Steam chest 5 provides heat to the emulsion and free oil whereby complete separation of the oil and water components of the emulsion stream is accomplished. The heating of the emulsion and oil strata by the steam chest 5 causes some gentle convection currents but only enough to provide efficient heating of the strata and not enough turbulence to disturb the natural quiescent separation of the components.

The separated oil flows in oil stratum 39 through filter bed 24 and out through oil outlet 25. Separated water travels through water stratum 43 to water outlet 32 where it is discharged from treater 1 through a valve (not shown) which is controlled by float 28, thereby controlling the height of emulsion-water interface 42. Often it is desirable to place a grating (not shown) within treater 1 over the outlet 32 to prevent any whirl-pool effect when dumping the water from treater 1. The separated gas flows over baffles 18, 21 and 22 and out through gas outlet 23 under the control of a back pressure valve (not shown).

Thus it may be seen that we have provided a treater in which the major portion of the flow of a separated component is not through the stratum of the other component but is slightly divergent from the emulsion stratum towards its own stratum and mostly undisturbed (without turbulence) near the stratum of emulsion.

What we claim and desire to secure by Letters Patent is:

1. An oil and water emulsion treater comprising, a horizontally disposed cylindrical vessel having an inlet end and an outlet end adapted to contain distinct oil and water strata along the entire length of said vessel and an emulsion stratum therebetween, an emulsion inlet into the inlet end of said vessel, a treated oil outlet extending from the outlet end of said vessel, said treated oil outlet positioned in said vessel to maintain the desired upper level of said oil stratum in said vessel, a water outlet extending from the outlet end of said vessel, control means associated with said water outlet to maintain the desired upper level of said water stratum in said vessel, a heater in said vessel, said heater extending into the inlet end of said vessel and extending horizontally through more than half the length of said vessel above said water stratum, an inlet spreader extending from a position above the upper level of said oil stratum and sloping downwardly in said oil stratum to a position beside said heater and above the upper level of said water stratum, said inlet spreader comprising a sloping bottom and upwardly extending flanges secured to each side of said sloping bottom, said emulsion inlet being connected to said inlet spreader to discharge the influent emulsion stream thereon between said flanges at a position above the upper level of said oil stratum, a portion of said inlet spreader being positioned in close spaced relationship to said heater to heat said inlet spreader for initially heating said influent emulsion stream to liberate gas from said influent emulsion stream and for heating said emulsion stream during its flow down said inlet spreader to preheat said influent emulsion stream prior to its discharge from said inlet spreader and a gas outlet from said vessel.

2. Invention according to claim 1 including, a transverse partition in said vessel having its lower edge in spaced relationship to said heater and the upper level of said water stratum and its upper edge positioned above the upper level of said oil stratum and spaced from the upper interior of said vessel, said partition positioned in said vessel between said oil outlet and said inlet spreader.

References Cited in the file of this patent

UNITED STATES PATENTS

| | | |
|---|---|---|
| 1,320,396 | Laird | Nov. 4, 1919 |
| 2,366,302 | Welch | Jan. 2, 1945 |
| 2,706,531 | Lovelady et al. | Apr. 19, 1955 |
| 2,751,998 | Glasgow | June 26, 1956 |
| 2,783,854 | Lovelady et al. | Mar. 5, 1957 |